US008163098B2

(12) United States Patent
Mullaney, Jr. et al.

(10) Patent No.: US 8,163,098 B2
(45) Date of Patent: Apr. 24, 2012

(54) FRYER FILTRATION ARRANGEMENT WITH BOIL-OUT BYPASS

(75) Inventors: Alfred E. Mullaney, Jr., Baltimore, MD (US); Paul Forrest, Severn, MD (US); Charles Amoss, Dundalk, MD (US)

(73) Assignee: Illinois Tool Works, Inc., Glenview, IL (US)

( * ) Notice: Subject to any disclaimer, the term of this patent is extended or adjusted under 35 U.S.C. 154(b) by 36 days.

(21) Appl. No.: 12/762,961

(22) Filed: Apr. 19, 2010
(Under 37 CFR 1.47)

(65) Prior Publication Data
US 2010/0192981 A1 Aug. 5, 2010

Related U.S. Application Data

(62) Division of application No. 11/233,522, filed on Sep. 22, 2005, now Pat. No. 7,698,994.

(51) Int. Cl.
*B08B 3/04* (2006.01)

(52) U.S. Cl. ............. 134/22.1; 134/10; 134/26; 134/36; 134/42; 134/108; 134/166 R; 134/169 R; 134/186; 99/403; 99/404; 99/405; 99/406; 99/407; 99/408; 99/409; 99/410; 426/478; 426/496; 210/167.01; 210/167.28; 210/175; 210/416.1; 210/416.5; 219/429; 219/437; 219/438; 219/439; 219/440; 219/441

(58) Field of Classification Search ............ 99/403–410; 426/478, 496; 210/167.28, 416.1, 416.5, 210/167.01, 175; 219/429, 437–441; 134/10, 134/22.1, 26, 36, 42, 108, 166 R, 169 R, 134/186

See application file for complete search history.

(56) References Cited

U.S. PATENT DOCUMENTS 445,223 A 1/1891 Knight
(Continued)

FOREIGN PATENT DOCUMENTS

DE 2746728 4/1979
(Continued)

OTHER PUBLICATIONS

Installation, Operation and Care of Models MF50 and MF85 Mobile Filters, Instructions, Vulcan-Hart Company, 1998, pp. 1-12.

(Continued)

*Primary Examiner* — Bibi Carrillo
(74) *Attorney, Agent, or Firm* — Baker & Hostetler LLP

(57) ABSTRACT

The disclosure features a method of performing a boil-out cleaning process in connection with a fryer. The fryer includes a vat, a vessel for receiving oil drained from the vat, the vessel movable from an under-unit position, an oil drain path leading from an outlet opening of the vat to the pan, and an oil return path from the vessel back to the vat. The oil return path includes a pump. A drain valve is located along the oil drain path. The drain valve is opened to drain oil from the vat into the vessel is opened. The drain valve is closed after draining the oil from the vat. A boil-out cleaning fluid is delivered to the vat and the boil-out cleaning fluid is heated. A boil-out drain path is provided with an inlet positioned for receiving boil-out fluid from the drain valve and an outlet positioned forward of a front of the fryer unit. A container is placed below the outlet of the boil-out drain path. The drain valve is opened so that boil-out fluid is delivered from the vat to the container without passing through the pump. The drain valve is closed, and The pump is activated to deliver oil from the vessel back to the vat.

23 Claims, 5 Drawing Sheets

U.S. PATENT DOCUMENTS

| | | | |
|---|---|---|---|
| 2,359,368 A | 10/1944 | Klopfenstein | |
| 2,424,211 A | 7/1947 | Webb | |
| 2,578,129 A | 12/1951 | Daugherty | |
| 2,610,740 A | 9/1952 | Hunter | |
| 2,635,527 A | 4/1953 | Overbeck et al. | |
| 2,760,641 A | 8/1956 | Mies, Jr. et al. | |
| 2,914,063 A | 11/1959 | Wagner | |
| 3,045,827 A | 7/1962 | Hough | |
| 3,107,601 A | 10/1963 | Longmire | |
| 3,147,220 A | 9/1964 | Avery | |
| 3,159,095 A | 12/1964 | Wagner | |
| 3,210,193 A | 10/1965 | Martin | |
| 3,263,818 A | 8/1966 | Gedrich | |
| 3,279,605 A | 10/1966 | Shepherd | |
| 3,410,199 A | 11/1968 | Quednau | 99/403 |
| 3,477,361 A | 11/1969 | Bradshaw | 99/408 |
| 3,483,981 A | 12/1969 | Gordon | |
| 3,608,472 A | 9/1971 | Pelster et al. | |
| 3,649,290 A | 3/1972 | Angold | |
| 3,667,374 A | 6/1972 | Holmes | |
| 3,685,433 A | 8/1972 | Cunningham | |
| 3,701,313 A | 10/1972 | Boggs | 99/330 |
| 3,735,871 A | 5/1973 | Bisko | |
| 3,797,378 A | 3/1974 | Morris | |
| 3,894,482 A | 7/1975 | Murphy | |
| 3,973,481 A | 8/1976 | Mies | |
| 3,977,973 A | 8/1976 | Anderson | |
| 4,084,492 A | 4/1978 | Sullivan | |
| 4,113,623 A | 9/1978 | Koether et al. | |
| 4,324,173 A | 4/1982 | Moore et al. | |
| 4,328,097 A | 5/1982 | Whaley et al. | |
| 4,420,006 A | 12/1983 | Moore et al. | |
| 4,444,095 A | 4/1984 | Anetsberger et al. | |
| 4,460,818 A | 7/1984 | Anetsberger et al. | |
| 4,487,691 A | 12/1984 | Panora | |
| 4,591,434 A | 5/1986 | Prudhomme | |
| 4,604,203 A | 8/1986 | Kyle | |
| 4,607,857 A | 8/1986 | LeSage et al. | |
| 4,623,544 A | 11/1986 | Highnote | |
| 4,747,944 A | 5/1988 | George | |
| 4,768,426 A | 9/1988 | Nett | |
| 4,785,725 A | 11/1988 | Tate et al. | |
| 4,805,525 A | 2/1989 | Bivens | |
| 4,826,590 A | 5/1989 | Turman | |
| 4,890,548 A | 1/1990 | Grob et al. | |
| 4,895,137 A | 1/1990 | Jones et al. | |
| 4,899,649 A | 2/1990 | Grob et al. | |
| 4,945,893 A | 8/1990 | Manchester | |
| 4,959,144 A | 9/1990 | Bernard et al. | |
| 4,974,501 A | 12/1990 | Grob et al. | |
| 4,994,181 A | 2/1991 | Mullaney, Jr. | |
| 5,143,604 A | 9/1992 | Bernard et al. | |
| 5,247,876 A | 9/1993 | Wilson et al. | |
| 5,253,566 A | 10/1993 | McCabe et al. | |
| 5,261,322 A | 11/1993 | Yokoyama et al. | |
| 5,297,474 A | 3/1994 | Tabuchi | |
| RE34,636 E | 6/1994 | Bivens | |
| 5,404,799 A | 4/1995 | Bivens | |
| 5,449,469 A | 9/1995 | Burklund et al. | |
| 5,458,772 A | 10/1995 | Eskes et al. | |
| 5,486,370 A | 1/1996 | Bivens | |
| 5,577,438 A | 11/1996 | Amitrano et al. | |
| 5,582,093 A | 12/1996 | Amitrano et al. | |
| 5,595,107 A | 1/1997 | Bivens | |
| 5,597,601 A * | 1/1997 | Griffin | 426/417 |
| 5,680,811 A | 10/1997 | Highnote et al. | |
| 5,709,899 A | 1/1998 | Bivens | |
| 5,731,024 A | 3/1998 | Bivens | |
| 5,743,175 A | 4/1998 | Crain et al. | |
| 5,870,945 A | 2/1999 | Bivens | |
| 6,095,037 A | 8/2000 | Savage et al. | |
| 6,235,210 B1 * | 5/2001 | Saksena | 210/791 |
| 6,269,808 B1 | 8/2001 | Murahashi | |
| 6,306,294 B1 | 10/2001 | Blair | |
| 6,378,420 B1 | 4/2002 | Savage et al. | |
| 6,470,794 B2 | 10/2002 | Takahashi | |
| 6,572,764 B2 | 6/2003 | Mullaney | |
| 6,792,983 B2 | 9/2004 | Allora | |
| 6,890,428 B2 * | 5/2005 | Mullaney, Jr. | 210/167.28 |
| 2002/0026875 A1 * | 3/2002 | Chikazawa et al. | 99/403 |
| 2004/0159243 A1 | 8/2004 | Theodos | |

FOREIGN PATENT DOCUMENTS

| | | |
|---|---|---|
| EP | 0649622 | 4/1995 |
| GB | 2 307 650 | 6/1997 |
| JP | 2001-327414 | 11/2001 |

OTHER PUBLICATIONS

Installation and Operation Manual, 47 Series Gas Fryers, Frymaster L.L.C., Nov. 1998.

Specification Sheet for Filter System for High Efficiency Fryers, Vulcan-Hart Corporation (Nov. 1986).

Operating, Installation, Service & Parts Manual for High Efficiency Fryer Filtermate, Vulcan-Hart Corporation (Jan. 1986).

"Magnum Retrofit Kit Eliminates Filter Paper," Date: 1996, 2 pages.

"840546 Magnum Filter Leaf Kit—Fry Master Footprint II (CxC)," Date: Feb. 1999, 4 pages.

"Kitchen Equipment, Frymaster Filter," Date: Apr. 1999, 1 page.

* cited by examiner

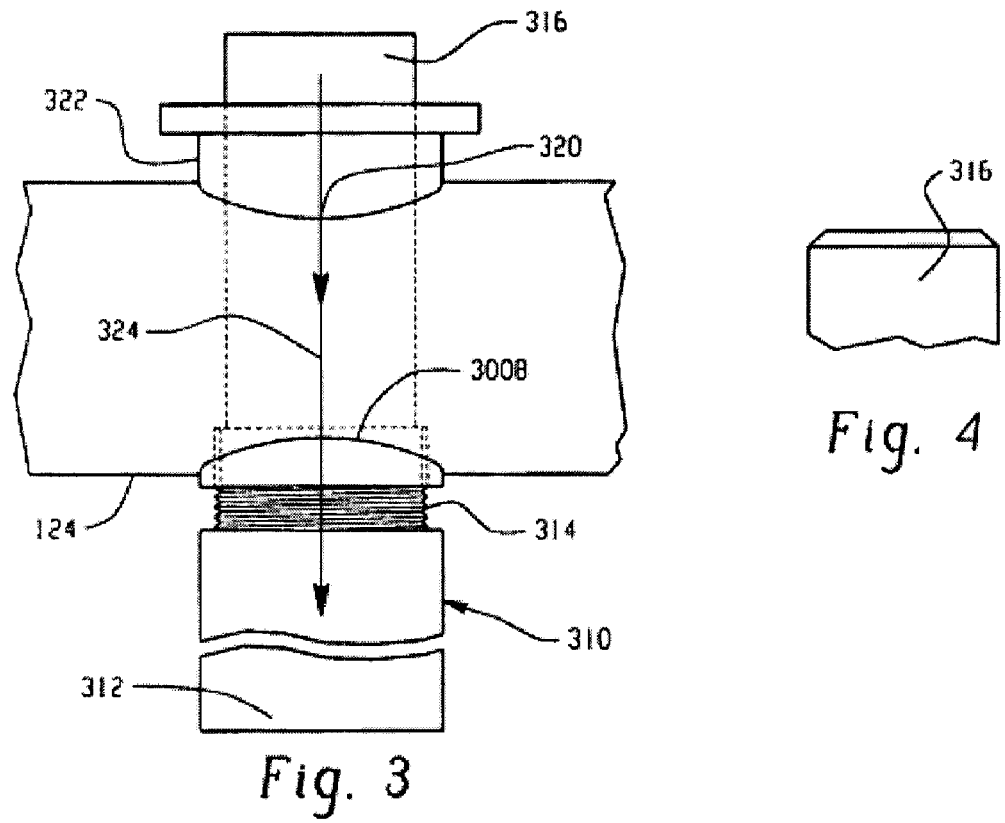
Fig. 3
Fig. 4
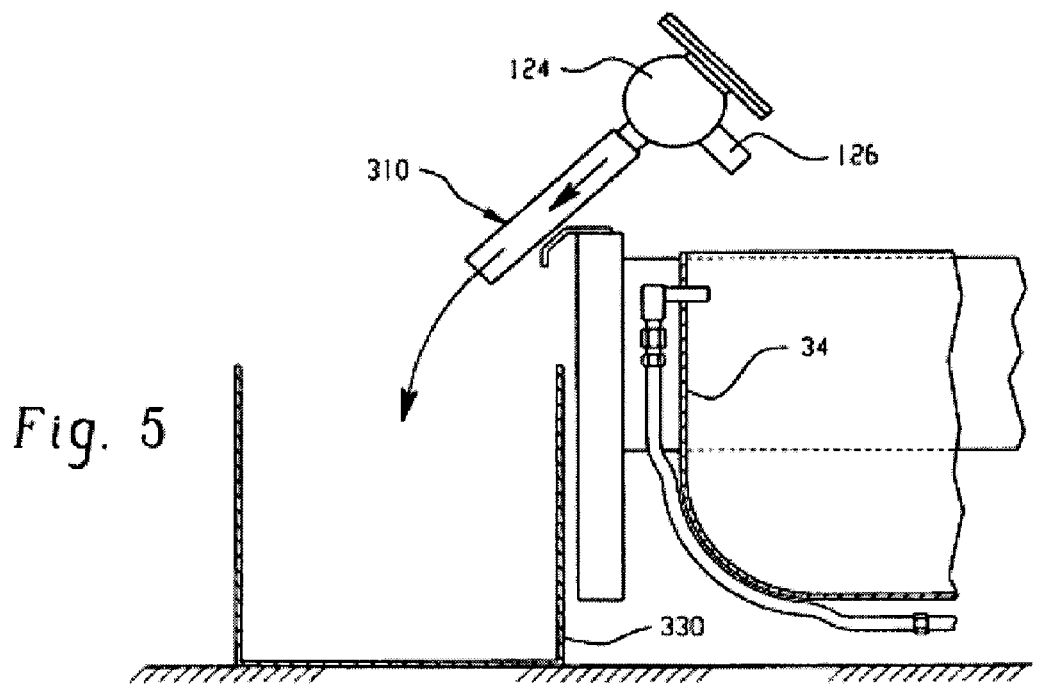
Fig. 5

US 8,163,098 B2

FRYER FILTRATION ARRANGEMENT WITH BOIL-OUT BYPASS

CROSS REFERENCE TO PRIOR APPLICATIONS

This application is a Divisional of a U.S. patent application Ser. No. 11/233,522 filed on Sep. 22, 2005, now U.S. Pat. No. 7,698,994 issued on Apr. 20, 2010, which is hereby incorporated by reference for all purposes as if fully set forth herein.

BACKGROUND OF THE DISCLOSURE

1. Field of the Disclosure

The present invention relates generally to deep-fat fryers and, more particularly, to a, deep-fat fryer cooking oil filtration arrangement that includes a boil-out bypass feature.

2. Related Art

A typical deep-fat fryer will include a fryer vat containing a heated bath of cooking oil. The cooking oil is adapted to receive baskets of food products such that the food products will be immersed within and cooked by the heated cooking oil. Such fryers include a heat exchanger, which may take the form of in vat fire tubes and associated burners, with combusted gases being passed therethrough to heat the oil.

To extend the useful life of the cooking oil, it is a common practice to filter the particulate food matter from the cooking oil to minimize the carbonization of such food matter within the cooking oil. Various configurations of filtering systems in which oil is drained from the vat into a pan, tub or other below unit containment vessel and then passed through a filter have been provided, with a pump used to return oil to the fryer vat after the oil has been filtered.

The cleaning process for fryer vats typically involves a "boil-out" process in which the vat is filled with a mixture of oil and vinegar and the heating system of the fryer is run to produce a boiling of the mixture, which in turn cleans the vat. Once the boil-out process is completed, the mixture must be removed from the vat, preferably drained without leaving any significant amount of the mixture in the unit and without running the mixture through the pump, as that may degrade the pump/motor assembly causing early failure. Typically, oil in the vat is drained into the pan, tub or other below unit containment vessel of the oil filtering system prior to the boil-out. Upon completion of the boil-out, including removal of the cleaning mixture, the oil in the vessel is returned to the vat. Since the oil is held in the below unit vessel during boil-out, the below unit vessel is not available for draining of the cleaning mixture. It would be desirable to provide a fryer that facilitates removal or draining of the boil-out cleaning mixture.

SUMMARY OF THE DISCLOSURE

In one aspect, the disclosure features a method of performing a boil-out cleaning process in connection with a fryer. The fryer includes a vat, a vessel for receiving oil drained from the vat, the vessel movable from an under-unit position, an oil drain path leading from an outlet opening of the vat to the pan, and an oil return path from the vessel back to the vat. The oil return path includes a pump. A drain valve is located along the oil drain path. The method includes opening the drain valve to drain oil from the vat into the vessel, closing the drain valve after draining the oil from the vat, delivering a boil-out cleaning fluid to the vat and heating the boil-out cleaning fluid, providing a boil-out drain path with an inlet positioned for receiving boil-out fluid from the drain valve and an outlet positioned forward of a front of the fryer unit, placing a container below the outlet of the boil-out drain path, opening the drain valve so that boil-out fluid is delivered from the vat to the container without passing through the pump, closing the drain valve, and operating the pump to deliver oil from the vessel back to the vat.

The boil-out drain path may include a removable boil-out drain pipe that extends into a laterally extending manifold that forms part of the oil drain path. The boil-out drain pipe may be removed while the oil is drained from the vat to the vessel. The boil-out drain pipe may be attached during delivery of boil-out fluid to the container. The drain valve may include a three way valve with an inlet and two outlets. The boil out drain-path may include a boil-out drain pipe associated with one outlet of the drain valve.

According to another aspect of the disclosure, a method of operating a fryer includes draining oil from a vat to a vessel via an oil drain path, closing the oil drain path, filling the vat with a boil-out cleaning fluid, heating the boil-out cleaning fluid to clean the vat, connecting a fluid drain path to the oil drain path to direct the boil-out cleaning fluid from the vat to a location outside the fryer, and opening the oil drain path to drain the boil-out cleaning fluid to the location outside the fryer via the fluid drain path.

The method may further include closing the oil drain path, and moving the oil from the vessel to the vat via an oil return path. The moving the oil from the vessel to the vat may include pumping the oil. The oil drain path may include a valve, and the closing and opening the oil drain path may include closing and opening the valve, respectively.

The connecting the fluid drain path may include connecting a drain pipe to the oil drain path, the drain pipe including a first end configured to engage the oil drain path and a second end extending to the location outside the fryer. The method may further include placing a container below the second end of the drain pipe, wherein the boil-out cleaning fluid is drained to the container via the drain pipe by gravity. The connecting the drain pipe to the oil drain path may include removing a cap exposing an opening of the oil drain path, and inserting the first end of the drain pipe to the oil drain path via the opening.

According to another aspect of the disclosure, a method of cleaning a fryer includes closing a valve on an oil drain path extending from a vat to a vessel, filling the vat with a boil-out cleaning fluid, heating the vat to boil the boil-out cleaning fluid therein, connecting a fluid drain path to the oil drain path, the fluid drain path extending to a location outside the fryer, and opening the value on the oil drain path to drain the boil-out cleaning fluid from the vat to outside the fryer via the fluid drain path.

The connecting the fluid drain path to the oil drain path may prevent the boil-out cleaning fluid from being drained to the vessel. The method may further include disconnecting the fluid drain path from the oil drain path after the boil-out cleaning fluid is drained.

The method may further include opening the valve to drain oil in the vat to the vessel prior to the step of closing the valve. The method may further include closing the valve after the boil-out cleaning fluid is drained from the vat to the location outside the fryer, and pumping the oil in the vessel to the vat via an oil return path extending therebetween.

The connecting the fluid drain path to the oil drain path may include connecting a pipe to the oil drain path, the pipe having a first end configured to engage the oil drain path and extending downwardly to a second end located outside the fryer. The method may further include placing a container under the second end of the pipe. The boil-out cleaning fluid may be drained from the vat to the container by gravity. The connecting the pipe to the oil drain path may include removing a cap covering an opening of the oil drain path, and inserting the first end of the pipe into the opening of the pipe. The engagement between the first end of the pipe and the oil drain path may prevent the boil-out cleaning fluid from being drained to the vessel.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 3 depicts one embodiment of a boil-out drain pipe;

FIG. 4 depicts an alternative embodiment of the end of a boil-out drain pipe;

FIG. 5 is a partial side view depicting position of the installed boil-out drain pipe;

DETAILED DESCRIPTION OF THE DISCLOSURE

Figure 1:
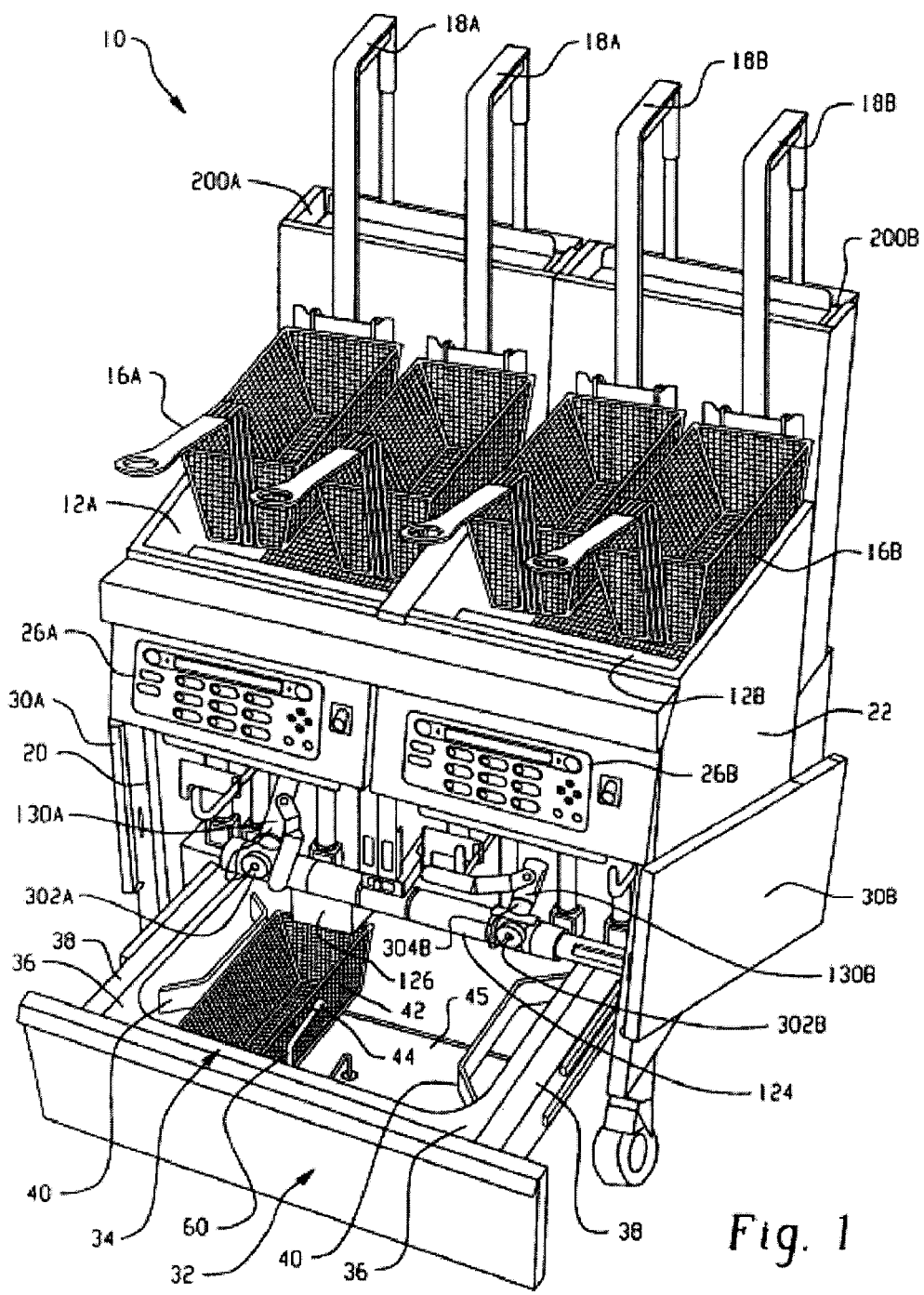
FIG. 1 depicts a prior art fryer including a filtration arrangement.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 2:
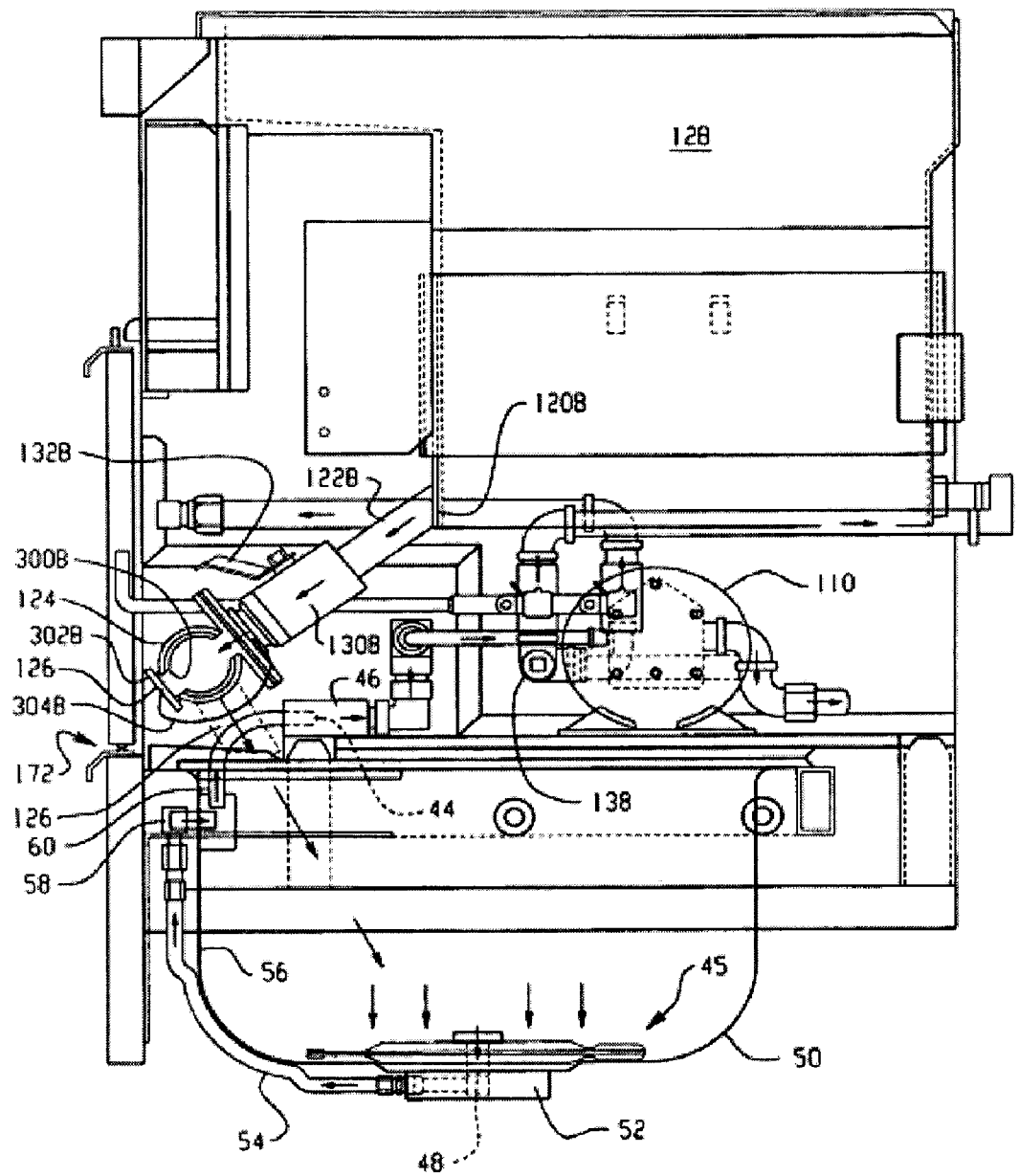
FIG. 2 is a side elevation of the oil pan and associated filter assembly of the fryer of FIG. 1.

Referring to drawing FIGS. 1 and 2, a fryer filtration arrangement similar to that shown and described in U.S. Pat. No. 6,890,428 is shown, with certain modifications made for implementing the boil-out bypass feature. The fryer 10 includes two fryer vats 12A and 12B. Each fryer vat includes at least one respective basket 16A and 16B which is automatically movable upward and downward via respective positioning guides 18A and 18B in a manner well known in the art. Manual raising and lowering of the baskets is also possible in some fryers. The fryer 10 includes a frame 20 which preferably includes associated housing 22 such as stainless steel. A front panel 24 of the fryer 10 includes a control and display panel 26A and 26B for each fryer vat. The lower portion of the housing frame includes a set of doors 30A, 30B which are movable between open and closed positions, and which are illustrated in the open position. Below the doors 30A, 30B a drawer 32 which is movable between open and closed positions relative to the frame 20 is provided, the drawer being illustrated in the open position. Positioned within the drawer 32 is an oil receiving pan 34 having a rim 36 which sits on rails 38 of the drawer 32. Handles 40 extend from the interior sidewalls of the pan 34 to allow the pan to be easily picked up and removed from the drawer to facilitate cleaning at a location away from the fryer 10. Positioning of the handles 40 on the inner portion of the pan helps facilitate simple positioning of the pan in the drawer 32. As used herein, the term "pan" is intended to broadly encompass any oil receiving container, unless otherwise specifically indicated.

A basket type screen 42 is removably positioned within the pan 34 for filtering out debris entering the pan 34 within oil which is drained from one of the fryer vats 12A and 12B. At the bottom of the pan 34 a filter assembly 45 is provided for filtering the oil. An oil return path from the pan 34 back to the fryer vat 12A, 12B is formed in part by a coupler 44 which is connected to and extends from a front sidewall of the pan 34. The illustrated coupler 44 extends rearwardly back toward the fryer frame 20. A corresponding coupler 46 (FIG. 2) is positioned on the fryer frame 20, with the two couplers aligned for slidingly mating with each other in a friction fit arrangement when the drawer 32 is moved to a closed position.

In the illustrated fryer 10, each vat 12A, 12B includes an associated exhaust stack 200A, 200B formed at the back of the fryer for venting combustion gases produced by the oil heating system which includes in vat fire tubes.

Referring now to FIG. 2, the pan 34 includes an outlet opening 48 through its bottom wall 50. The oil return path is formed in part by a flow passage through member 52 and piping 54 which runs along the external surface of bottom wall 50 and front wall 56 of the pan 34.

Near the top of front wall 56 a wall penetrating coupling assembly 58 passes through the wall 56, with piping 60 extending upward from the pan 34 and rearwardly as shown. The end of piping 60 acts as the return coupler 44. The return coupler 44 mates with corresponding coupler 46.

The oil return path leads back to the fryer vat and includes a pump 110, which may be driven by an electric motor, positioned therealong for drawing oil out of the pan 34 and pumping it back to the vat. Oil traveling out of the pan 34 during a filtration operation travels from the pan 34, through the outer filter screen material of the filter assembly 45, into the interior of the filter assembly 45, and out of the interior of the filter assembly 45. Operation of the pump 110, and the associated flow of oil drawn out of the pan 34, creates a suction force for holding the coupler of the filter assembly 45 to the coupler of the pan 34, without requiring any latch or hold down member. The suction force created by the pump 110, and the associated flow of oil drawn out of the pan 34, also holds the return coupler 44 of the pan 34 to the corresponding coupler 46 of the fryer frame 20 so as to maintain the drawer 32 in a closed position during a filtration operation, without requiring any positive latch.

In FIG. 2, the fryer vat 12B is shown. An outlet opening 120B in a wall of the 12B leads to a draining pipe 122B. The draining pipe 122B leads to a drain pipe/manifold 124 which extends laterally across a front portion of the fryer 10 as seen in FIG. 1. The drain pipe 124 includes an outlet 126 for delivering oil into the pan 34. Fryer vat 12A includes a similar drainage path to the manifold 124. Thus, each vat 12A, 12B includes a respective oil drain path extending from its outlet opening to the pan 34. Positioned along each oil drain path is a flow control device 130A, 130B for controlling the draining of each vat. In particular, each flow control device may be a manually operable valve including a respective handle 132A, 132B for permitting a user to open and close the drain path as desired. Of course, other flow control devices may be used, including automatically controlled devices.

In connection with the boil-out cleaning process, one vat at a time is typically cleaned. For example, with respect to vat 12B, drain valve 130B would be opened to allow the oil from vat 12B to drain into the pan 34. The oil may be circulated through the vat 12B, pan 34 and filter 45 for a period of time to filter out debris. The drain valve 130B is then closed. The vat 12B can then be filled with the cleaning fluid, which as described above may be a combination of oil and vinegar. The heating system for vat 12B is then operated to bring the cleaning fluid to a boil for a cleaning time period, after which the cleaning fluid can be removed from the vat 12B. In this regard, the manifold 124 includes boil-out drain opening 300B that is typically covered by a cap member 302B, which may have an associated tether 304B to avoid loss of the cap member when removed. The opening 300B is located in line with the drain path pipe 122B and the drain valve 130B. In the illustrated 2-vat fryer, a similar boil-out drain opening and cap member 302A is provided in line with drain valve 130A (see FIG. 1). The boil-out drain openings are adapted to receive a drain pipe as will be described in detail below.

Referring now to FIG. 3, in one embodiment, the boil-out opening 300B is internally threaded to threadingly receive the drain pipe 310. The cap member may likewise include external threads for closing the opening. The illustrated boil-out drain pipe has an unthreaded drain end 312, an externally threaded middle coupling portion 314 and an unthreaded, smaller diameter extension 316 which passes through diametrically opposite opening 320. Opening 320 includes an associated mount flange 322 to which the drain valve 130B (not shown) can be coupled. The end of extension 316 may be sized and configured for seating against an internal portion of the drain valve so that, with drain pipe 312 in place, when the drain valve is opened, the boil-out cleaning fluid bypasses the manifold 124 and instead passes directly along the drain pipe path 324 and out of the drain pipe 310, thereby avoiding mixing of the boil-out cleaning mixture with the oil in the pan. Once the boil-out cleaning mixture is drained, the valve is closed and the drain pipe is unthreaded from opening 300B. The cap member is then replaced, returning the fryer unit to its normal operating configuration. Referring to FIG. 4, in an alternative embodiment; the end of the extension 316 could be tapered as shown, for seating against the inside surface of the flange 322. Referring to the partial side view of FIG. 5, note that the boil-out drain pipe 310 can be installed with the drawer unit in its closed position, and extends forward of the drawer unit, enabling a boil-out container 330, such as a bucket or pan, to be placed in the front of the unit to receive the draining boil-out cleaning fluid. This feature is advantageous because, in many cases, the pan 34 will contain the vat oil and it would be undesirable to have to pull the pan out in such instances.

Figure 6:
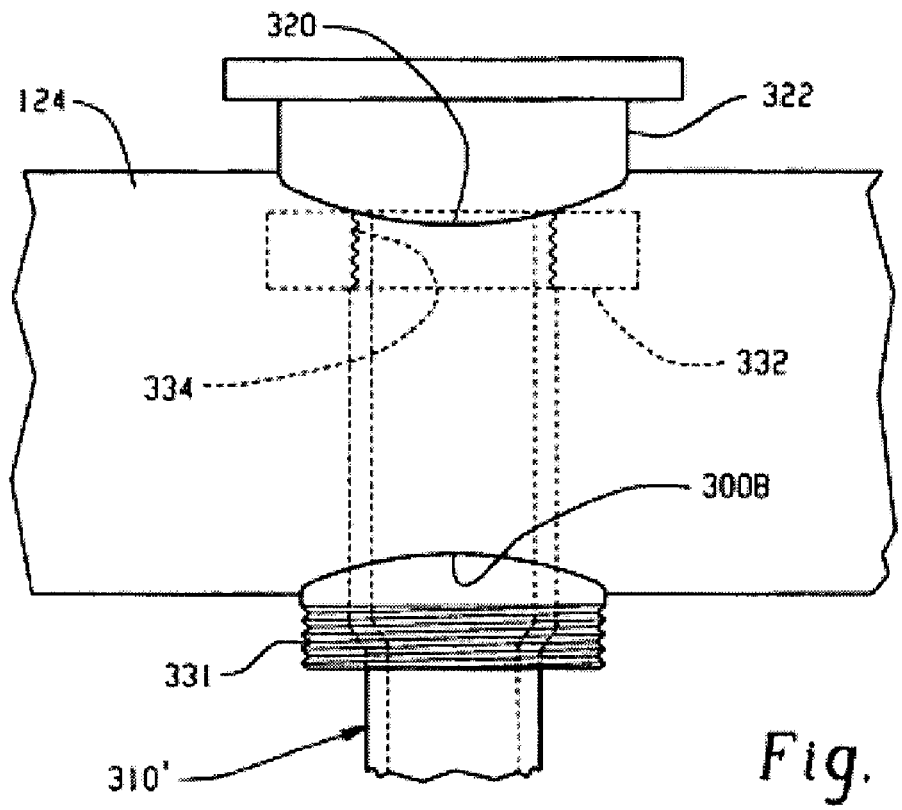
FIGS. 6 and 7 show an alternative embodiment of a boil-out drain pipe.
Figure 7:
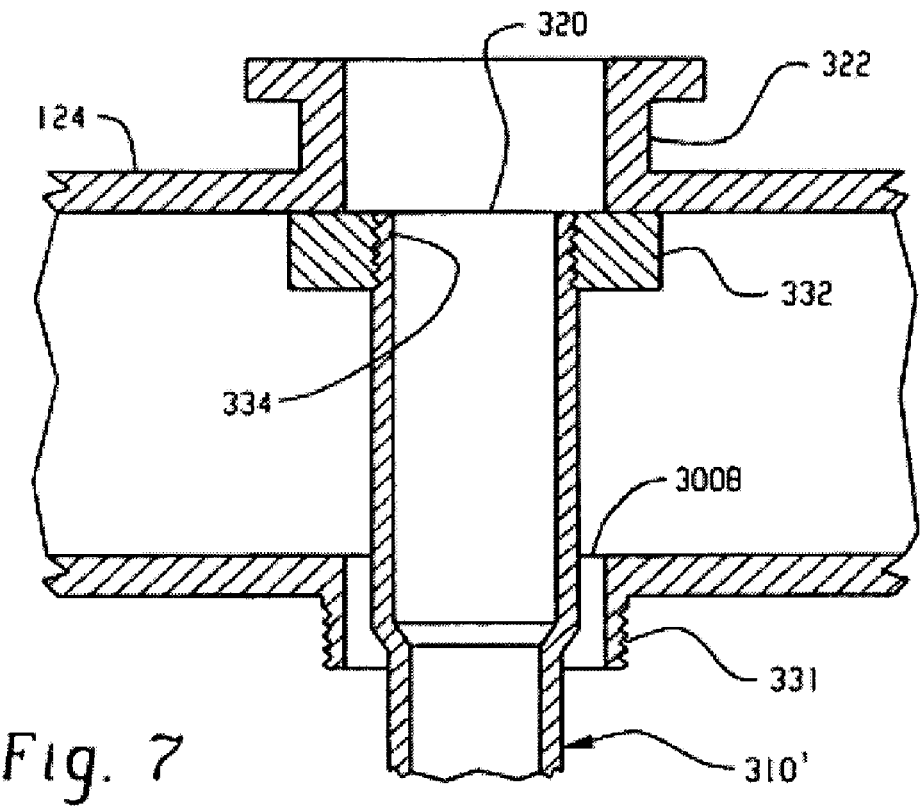

Referring now to FIGS. 6-7, another embodiment is shown in which boil-out opening 300B includes a flange 331 that is externally threaded (in which case the cap member is internally threaded for attachment). The boil-out drain pipe 310' passes through opening 300B without connection thereto. The opening 320 is includes an internally located threaded coupling 332 for receiving the end 334 of the drain pipe 310' which is correspondingly threaded. Similar to FIG. 5, the drain pipe 310' may extend out past the drawer when installed, facilitating positioning of a boil-out cleaning fluid receiving vessel.

Thus, for a typical boil out of a given vat, oil is drained from the vat into the pan by opening the drain valve. The drain valve is closed. The vat is filled with the boil-out cleaning fluid. The heating system of the vat is operated for a cleaning time period. The cap member associated with the boil-out opening for the vat is removed. The boil-out drain pipe is installed. The boil-out cleaning fluid vessel is positioned in front of the fryer below the outlet of the boil-out drain pipe. The drain valve associated with the vat is opened, allowing the boil-out cleaning fluid to exit the unit via the boil-out drain pipe, bypassing the manifold. The valve is closed. The boil-out drain pipe is removed. The cap member of the boil-out opening is put back in place and the drain valve is closed. The oil in the pan is pumped back into the vat. In this way, the pump need not be used for moving the boil-out cleaning fluid, and the under unit oil-receiving pan or other vessel can be kept in place during the entire boil-out process.

Figure 9:
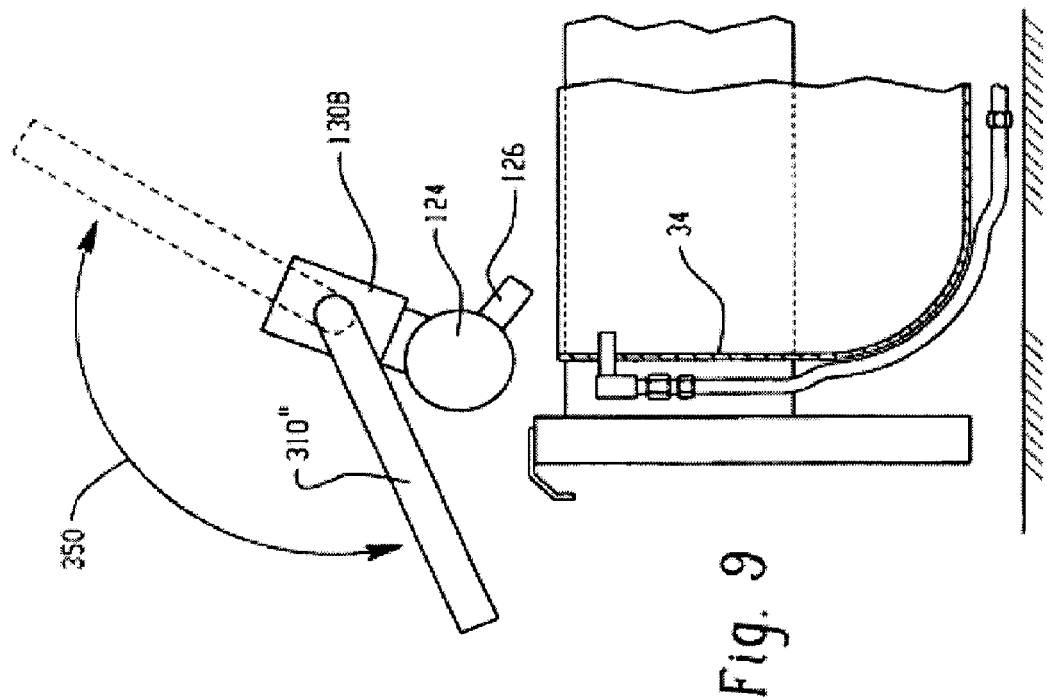
FIG. 9 shows a schematic of en embodiment having a stowable drain pipe.
Figure 8:
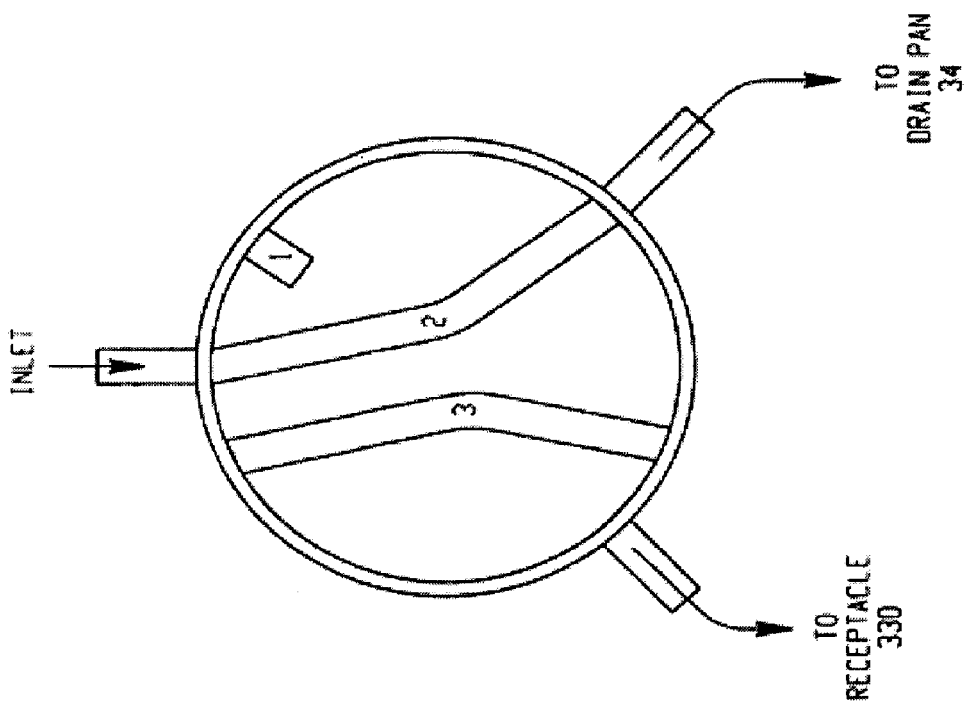
FIG. 8 shows a schematic of an alternative embodiment using a three way valve.

In an alternative embodiment, as shown in FIG. 8, the valve 132B could be replaced by a three way valve. In one position, the valve is closed, preventing the contents of the vat from draining. In a second position the valve is opened to allow oil to be drained into the manifold 124 and ultimately into the oil-receiving drain pan 34. In a third position the valve is opened to a allow the boil-out cleaning liquid to be diverted by a separate drain line/boil-out drain pipe, which need not be associated at all with the manifold, to a receptacle 330 for disposal. In one embodiment of this implementation the separate boil-out drain pipe may be a component that is not regularly removed from the fryer. Instead, and as shown in FIG. 9, the boil-out drain pipe 310" could be movable, as by rotation per arrow 350, between a stowed position within the fryer (shown in dashed line form) and a use position in which the boil-out drain pipe extends forward of the front of the fryer (shown in solid line form).

Various boil-out drain pipe constructions have been shown and described. Regardless of the exact construction, the pipe may be formed as a single piece or as multiple different pieces coupled together as by press fitting or welding. The boil-out drain pipe could also be formed, in part or in whole, of a flexible or hose-like material. It is also recognized that the boil-out bypass path could be used for draining oil from the vat into a front located receptacle such as receptacle 330 of FIG. 5.

Variations on the foregoing are possible. For example, while a fryer including two vats has been shown above in the illustrated embodiment, fryers including more or less vats could incorporate the subject boil-out drain feature. While the various constructions have been described primarily in conjunction with vat 12B, it is recognized that in a multi-vat fryer apparatus each fryer vat could readily include a similar boil-out bypass feature.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A method of performing a boil-out cleaning process in connection with a fryer including a vat, a vessel for receiving oil drained from the vat, an oil drain path leading from an outlet opening of the vat to the pan, and an oil return path from the vessel back to the vat, the oil return path including a pump, a drain valve located along the oil drain path, the method comprising the steps of:
    opening the drain valve to drain oil from the vat into the vessel;
    closing the drain valve after draining the oil from the vat;
    delivering a boil-out cleaning fluid to the vat and heating the boil-out cleaning fluid;
    providing a boil-out drain path with an inlet positioned for receiving boil-out fluid from the drain valve and an outlet positioned forward of a front of the fryer unit;
    placing a container below the outlet of the boil-out drain path;
    opening the drain valve so that boil-out fluid is delivered from the vat to the container without passing through the pump;
    closing the drain valve; and
    operating the pump to deliver oil from the vessel back to the vat,
    wherein the boil-out drain path comprises a removable boil-out drain pipe that extends into a laterally extending manifold that forms part of the oil drain path, the boil-out drain pipe is removed while oil is drained from the vat to the vessel, the boil-out drain pipe is attached during delivery of boil-out fluid to the container.

2. The method of claim 1, wherein the drain valve comprises a three way valve with an inlet and two outlets, and the boil out drain-path comprises the boil-out drain pipe associated with one outlet of the drain valve.

3. The method of claim 1 wherein the boil-out drain pipe comprises threads to engage the oil drain path.

4. The method of claim 1 wherein the boil-out drain pipe comprises a hose portion.

5. A method of operating a fryer, comprising steps of:
    draining oil from a vat to a vessel via an oil drain path;
    closing the oil drain path;
    filling the vat with a boil-out cleaning fluid;
    heating the boil-out cleaning fluid to clean the vat;
    connecting a fluid drain path to the oil drain path to direct the boil-out cleaning fluid from the vat to a location outside the fryer; and
    opening the oil drain path to drain the boil-out cleaning fluid to the location outside the fryer via the fluid drain path,
    wherein the step of connecting the fluid drain path comprises a step of connecting drain pipe to the oil drain path, the drain pipe comprising a first end configured to engage the oil drain path and a second end extending to the location outside the fryer.

6. The method of claim 5, further comprising steps of:
    closing the oil drain path; and
    moving the oil from the vessel to the vat via an oil return path.

7. The method of claim 5, wherein the oil drain path comprises a valve, and the steps of closing and opening the oil drain path comprises steps of closing and opening the valve, respectively.

8. The method of claim 5, further comprising a step of placing a container below the second end of the drain pipe, wherein the boil-out cleaning fluid is drained to the container via the drain pipe by gravity.

9. The method of claim 5, wherein the step of connecting the drain pipe to the oil drain path comprises the steps of:
    removing a cap exposing an opening of the oil drain path; and
    inserting the first end of the drain pipe to the oil drain path via the opening.

10. The method of claim 5 wherein the boil-out drain pipe comprises threads to engage the oil drain path.

11. The method of claim 5 wherein the boil-out drain pipe comprises a hose portion.

12. The method of claim 6, wherein the step of moving the oil from the vessel to the vat comprises pumping the oil.

13. A method of cleaning a fryer, comprising the steps of:
    closing a valve on an oil drain path extending from a vat to a vessel;
    filling the vat with a boil-out cleaning fluid;
    heating the vat to boil the boil-out cleaning fluid therein;
    connecting a fluid drain path to the oil drain path, the fluid drain path extending to a location outside the fryer; and
    opening the valve on the oil drain path to drain the boil-out cleaning fluid from the vat to outside the fryer via the fluid drain path,
    wherein the step of connecting the fluid drain path to the oil drain path prevents the boil-out cleaning fluid from being drained to the vessel.

14. The method of claim 13, further comprising a step of disconnecting the fluid drain path from the oil drain path after the boil-out cleaning fluid is drained.

15. The method of claim 13, further comprising a step of opening the valve to drain oil in the vat to the vessel prior to the step of closing the valve.

16. The method of claim 13, wherein the step of connecting the fluid drain path to the oil drain path comprises a step of connecting a pipe to the oil drain path, the pipe having a first end configured to engage the oil drain path and extending downwardly to a second end located outside the fryer.

17. The method of claim 15, further comprising steps of:
    closing the valve after the boil-out cleaning fluid is drained from the vat to the location outside the fryer; and
    pumping the oil in the vessel to the vat via an oil return path extending therebetween.

18. The method of claim 16, further comprising a step of placing a container under the second end of the pipe.

19. The method of claim 16, wherein the step of connecting the pipe to the oil drain path comprises the steps of:
    removing a cap covering an opening of the oil drain path; and
    inserting the first end of the pipe into the opening of the pipe.

20. The method of claim 18, wherein the boil-out cleaning fluid is drained from the vat to the container by gravity.

21. The method of claim 19, wherein the engagement between the first end of the pipe and the oil drain path prevents the boil-out cleaning fluid from being drained to the vessel.

22. A method of cleaning a fryer, comprising the steps of:
    closing a valve on an oil drain path extending from a vat to a vessel;
    filling the vat with a boil-out cleaning fluid;
    heating the vat to boil the boil-out cleaning fluid therein;
    connecting a fluid drain path to the oil drain path, the fluid drain path extending to a location outside the fryer;

opening the valve on the oil drain path to drain the boil-out cleaning fluid from the vat to outside the fryer via the fluid drain path; and disconnecting the fluid drain path from the oil drain path after the boil-out cleaning fluid is drained.

23. A method of cleaning a fryer, comprising the steps of:

closing a valve on an oil drain path extending from a vat to a vessel;

filling the vat with a boil-out cleaning fluid;

heating the vat to boil the boil-out cleaning fluid therein;

connecting a fluid drain path to the oil drain path, the fluid drain path extending to a location outside the fryer; and opening the valve on the oil drain path to drain the boil-out cleaning fluid from the vat to outside the fryer via the fluid drain path; and opening the valve to drain oil in the vat to the vessel prior to the step of closing the valve.

\* \* \* \* \*